(12) United States Patent
Jones

(10) Patent No.: US 9,828,950 B2
(45) Date of Patent: Nov. 28, 2017

(54) SYSTEMS AND METHODS FOR DETECTING DAMAGE IN A POSITIVE CRANKCASE VENTILATION TUBE

(71) Applicant: GM Global Technology Operations LLC, Detroit, MI (US)

(72) Inventor: Marie-Christine G. Jones, Bingham Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 14/865,437

(22) Filed: Sep. 25, 2015

(65) Prior Publication Data
US 2017/0089302 A1    Mar. 30, 2017

(51) Int. Cl.
| | |
|---|---|
| G01M 3/16 | (2006.01) |
| F02M 25/08 | (2006.01) |
| F02M 35/10 | (2006.01) |
| F02D 41/22 | (2006.01) |
| F02M 25/06 | (2016.01) |
| F01M 13/00 | (2006.01) |
| F01M 1/02 | (2006.01) |
| F01M 1/10 | (2006.01) |
| G01M 3/18 | (2006.01) |

(52) U.S. Cl.
CPC .......... *F02M 25/0809* (2013.01); *F01M 1/02* (2013.01); *F01M 1/10* (2013.01); *F01M 13/00* (2013.01); *F02D 41/22* (2013.01); *F02M 25/06* (2013.01); *F02M 35/10222* (2013.01); *G01M 3/16* (2013.01); *G01M 3/165* (2013.01); *G01M 3/18* (2013.01); *G01M 3/182* (2013.01); *G01M 3/187* (2013.01); *G01M 3/188* (2013.01); *Y02T 10/121* (2013.01)

(58) Field of Classification Search
CPC .................................................. G01M 3/165
See application file for complete search history.

(56) References Cited

U.S. PATENT DOCUMENTS

| | | | | |
|---|---|---|---|---|
| 3,588,689 A * | 6/1971 | Crawford | ............... | G01R 31/08 324/519 |
| 4,949,076 A * | 8/1990 | Wann | ..................... | G01M 3/185 324/533 |
| 5,897,597 A * | 4/1999 | O'Daniel | ............... | G01M 3/025 123/574 |
| 6,144,209 A * | 11/2000 | Raymond | ............. | G01M 3/165 174/11 R |
| 6,386,237 B1 * | 5/2002 | Chevalier | ............... | F16L 11/12 116/208 |
| 6,706,348 B2 * | 3/2004 | Quigley | ................ | B29C 70/086 428/35.9 |

(Continued)

FOREIGN PATENT DOCUMENTS

WO    WO-2006086178 A1    8/2006

*Primary Examiner* — R. A. Smith
*Assistant Examiner* — Herbert K Roberts

(57) ABSTRACT

A positive crankcase ventilation (PCV) system for an engine includes: a PCV tube defining a flowpath extending along an axis; a damage detection circuit associated with the PCV tube. The PCV system also includes a damage detection module that selectively indicates that a fault is present in the PCV tube based on a change in a characteristic of the damage detection circuit and that illuminates a malfunction indicator lamp (MIL) when the fault is present.

13 Claims, 5 Drawing Sheets

(56) References Cited

U.S. PATENT DOCUMENTS

| | | | |
|---|---|---|---|
| 8,087,430 B1 | 1/2012 | Betz et al. | |
| 2002/0194934 A1* | 12/2002 | Taylor | G01L 1/205 |
| | | | 73/862.046 |
| 2004/0098212 A1* | 5/2004 | Hong | G01M 3/18 |
| | | | 702/51 |
| 2012/0032811 A1* | 2/2012 | Lee | G01M 3/165 |
| | | | 340/605 |

* cited by examiner

SYSTEMS AND METHODS FOR DETECTING DAMAGE IN A POSITIVE CRANKCASE VENTILATION TUBE

FIELD

The present disclosure relates to internal combustion engines, and more particularly to systems and methods for detecting damage in a positive crankcase ventilation (PCV) tube of an internal combustion engine.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air in the intake manifold is distributed to a plurality of cylinders and combined with fuel to create an air/fuel (A/F) mixture. The A/F mixture is combusted within the cylinders to drive pistons which rotatably turn a crankshaft and generate drive torque. The drive torque is then transferred to a driveline of a vehicle via a transmission. Exhaust gas produced during combustion may be expelled from the cylinders into an exhaust manifold and then treated by an exhaust treatment system before being released into the atmosphere.

Gases within a cylinder (i.e., the A/F mixture and/or the exhaust gas) may enter a crankcase of the cylinder. For example, excessive wear to the cylinder wall and/or the piston ring may allow the gases to enter the crankcase. Gases that enter the crankcase may also be referred to as "blow-by vapors." The crankcase includes the crankshaft which is connected to the piston. The crankcase also includes oil for lubricating the movement of the crankshaft and the piston and other moving parts. Blow-by vapors may contaminate the oil and should be evacuated out of the crankcase to prevent excessive pressure within the crankcase.

SUMMARY

In a feature, a positive crankcase ventilation (PCV) system for an engine is described. The PCV system includes: a PCV tube defining a flowpath extending along an axis; a damage detection circuit associated with the PCV tube. The PCV system also includes a damage detection module that selectively indicates that a fault is present in the PCV tube based on a change in a characteristic of the damage detection circuit and that illuminates a malfunction indicator lamp (MIL) when the fault is present.

In further features, the damage detection circuit is integrally formed with the PCV tube.

In further features, the damage detection circuit is molded into the PCV tube.

In further features, the damage detection circuit includes a conductor helically disposed about the axis of the flowpath.

In further features, the damage detection circuit has a pitch that is less than a flowpath dimension that is perpendicular to the axis.

In further features, the damage detection circuit includes a first conductor defining a left handed helix and a second conductor defining a right handed helix, and wherein the left handed helix has a first diameter, and the right handed helix has a second diameter, and the second conductor is electrically connected to the first electrical conductor.

In further features, the first diameter is greater than the second diameter.

In further features, the left handed helix defines a first pitch and the right handed helix defines a second pitch, and wherein at least one of the first pitch and the second pitch is less than a flowpath dimension that is perpendicular to the axis.

In further features, the first pitch and the second pitch are less than the flowpath dimension.

In further features, the damage detection module indicates that the fault is present in the PCV tube when a change in electrical resistance of the damage detection circuit is greater than a predetermined value.

In further features, the damage detection module stores a predetermined diagnostic trouble code (DTC) associated with the fault in the PCV tube in memory when the fault is present.

In a feature, a method for indicating the presence of a fault in a positive crankcase ventilation (PCV) tube of a vehicle is described. The method includes: receiving input indicative of a characteristic of a damage detection circuit associated with the PCV tube, the PCV tube defining a flowpath extending along an axis; selectively indicating that a fault is present in the PCV tube based on a change in the characteristic of the damage detection circuit; and illuminating a malfunction indicator lamp (MIL) when the fault is present.

In further features, the damage detection circuit is integrally formed with the PCV tube.

In further features, the damage detection circuit is molded into the PCV tube.

In further features, the damage detection circuit includes a conductor helically disposed about the axis of the flowpath.

In further features, the damage detection circuit has a pitch that is less than a flowpath dimension that is perpendicular to the axis.

In further features, the damage detection circuit includes a first conductor defining a left handed helix and a second conductor defining a right handed helix, wherein the left handed helix has a first diameter, and the right handed helix has a second diameter, and the second conductor is electrically connected to the first electrical conductor, and wherein the first diameter is greater than the second diameter.

In further features, the left handed helix defines a first pitch and the right handed helix defines a second pitch, wherein at least one of the first pitch and the second pitch is less than a flowpath dimension that is perpendicular to the axis, and wherein the first pitch and the second pitch are less than the flowpath dimension.

In further features, selectively indicating that a fault is present in the PCV tube includes indicating that the fault is present in the PCV tube when a change in electrical resistance of the damage detection circuit is greater than a predetermined value.

In further features, the method further includes storing a predetermined diagnostic trouble code (DTC) associated with the fault in the PCV tube in memory when the fault is present.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The following description is merely illustrative in nature and is in no way intended to limit the disclosure, its application, or uses.

PCV systems may be implemented to prevent damage caused by blow-by vapors. PCV systems may use a vacuum of an air intake system to draw blow-by vapors out of the crankcase and into the air intake system. Specifically, the blow-by vapors may be drawn through an air oil separation system to prevent oil from accumulating in the air intake system. The blow-by vapors, after traversing the air/oil separation system, are combined with the air/fuel mixture and combusted during subsequent combustion cycles.

PCV systems include one or more PCV tubes and may include one or more PCV flow or pressure regulators. A PCV tube connects the crankcase to the air intake system which is between the clean air filter and the cylinders and includes the intake manifold. The PCV tube may define a flowpath in fluid communication with the crankcase and the air intake system.

The flowpath of the PCV tube may define a cross-sectional dimension (e.g., an internal diameter) extending perpendicular to the flowpath. The PCV flow or pressure regulator(s) regulates the flow of blow-by vapors through the PCV tube and into the intake system. PCV systems may also include a breather tube that introduces additional fresh air into the crankcase for improved air circulation. In some instances, a PCV tube can allow flow in both directions (to and from the crankcase) and function as both a PCV tube and a breather tube.

A damaged PCV tube can allow blow-by vapors to escape into the atmosphere. A damaged PCV tube can also allow contaminants to enter the crankcase and/or the air intake system. For example, holes in the PCV tube can release blow-by vapors from the flowpath into the atmosphere, and/or allow contaminants to enter the flowpath from the atmosphere.

Accordingly, a system and method are presented for detecting damage to the PCV tube(s) of an engine. For example, the system and method may detect damage (e.g., a hole) in the PCV tube of the PCV system. The PCV tube may include an electrical circuit. For example, in some implementations, the electrical circuit may be embedded in the PCV tube. The system and method may detect a change in the electrical circuit, such as a break and/or a change in resistance of the electrical circuit. When the system and method detect damage to the PCV tube, the system and method may take one or more remedial actions, such as generating a diagnostic code, and/or setting a predetermined diagnostic trouble code in memory indicating a fault in the PCV system, and/or illuminate a malfunction indicator lamp.

Figure 1:
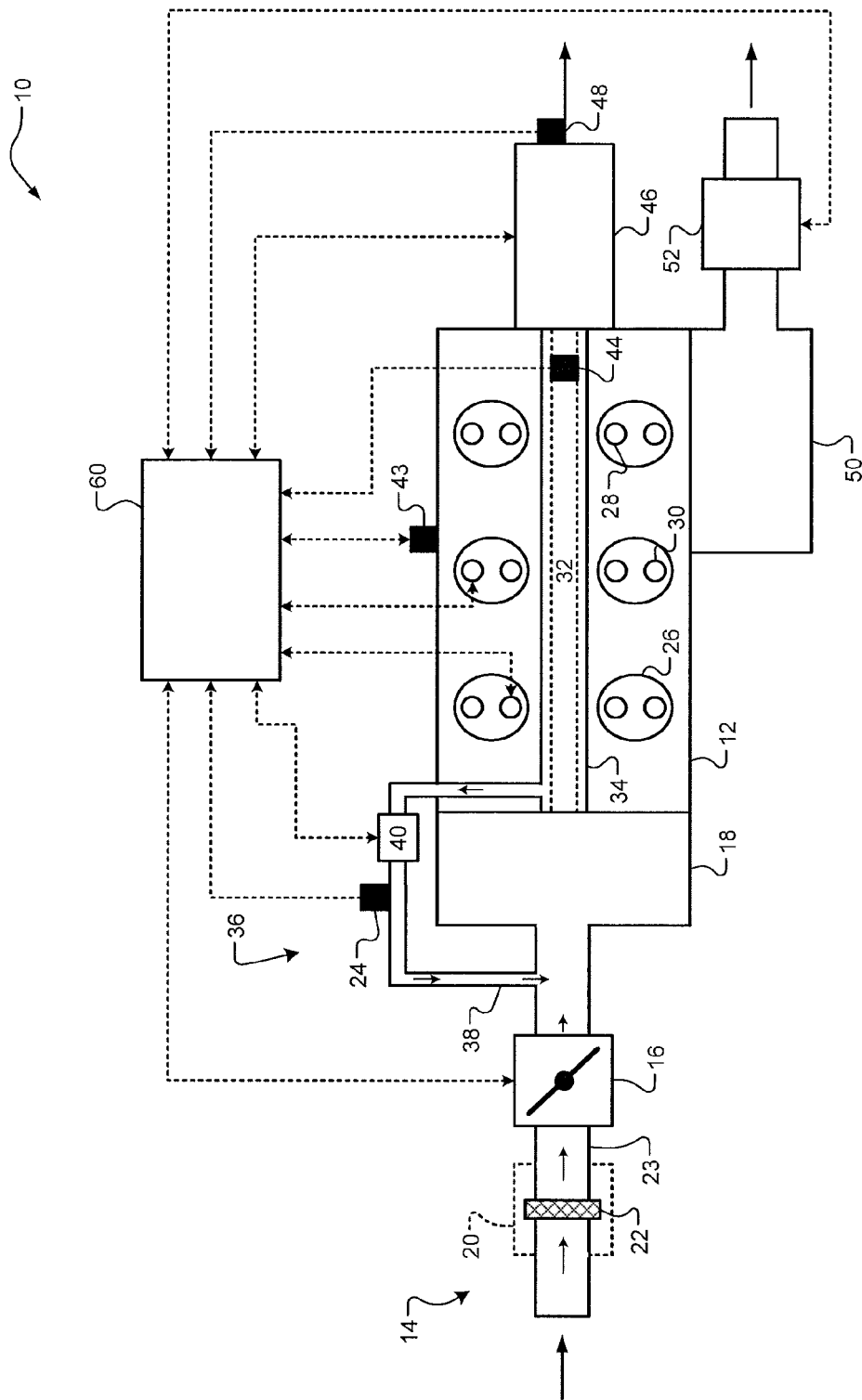
FIG. 1 is a functional block diagram of an engine system in accordance with the principles of the present disclosure.

Referring now to FIG. 1, an engine system 10 includes an engine 12. The engine 12 may be a spark ignition (SI) engine, a compression ignition (CI) engine, or a homogeneous charge compression ignition (HCCI) engine. While the example of the engine 12 being naturally aspirated is shown and will be discussed, the present application is also applicable to engines including one or more boost devices, such as one or more turbochargers and/or superchargers. The engine system 10 may also include a different type of engine and/or may include additional components such as an electric motor and a battery system.

The engine 12 draws air into an air intake system 14 through an air filter housing 20 and an air filter 22 that filters the air to remove particles. Airflow may be regulated by a throttle 16. For example, the throttle 16 may be electrically controlled using electronic throttle control (ETC).

Air in the intake manifold 18 is distributed to a plurality of cylinders 26. While six cylinders are shown, the engine 12 may include other numbers of cylinders. Fuel injectors 28 inject fuel into intake ports of the cylinders 26 (port fuel injection) or directly into the cylinders 26 (direct fuel injection). Spark plugs 30 may ignite the A/F mixture within the cylinders 26 to drive pistons, which rotatably turn a crankshaft 32 and generate drive torque. In CI and HCCI engines, however, spark plugs 30 may not be used for combustion or may be used merely for spark-assist, respectively. The crankshaft 32 may be connected to pistons (not shown) of the cylinders 26, respectively, and housed within a crankcase 34 that includes oil for lubrication of moving parts.

A PCV system 36 enable blow-by vapors to flow from the crankcase 34 into the air intake system 14 at a location downstream from the air filter 22. While the example of the location being between the throttle valve 16 and the intake manifold 18 is provided, blow-by vapors may be provided to the intake manifold 18 or another location between the air filter 22 and the intake manifold 18 including locations upstream or downstream of the throttle valve 16 and upstream of a boost device. The PCV system 36 may include a PCV tube 38.

A damage detection sensor 24 detects damage to the PCV tube 38, which is part of the PCV system 36. The PCV system 36 may also include a PCV valve or other flow or pressure regulator 40 that regulates the flow of blow-by vapors from the crankcase 34 to the air intake system 14. For example, the PCV valve 40 may include a spring-loaded valve (or an orifice or another airflow regulating device) that opens based on pressure differential between the crankcase 34 and the location where the PCV system 36 connects to the air intake system 14. The PCV valve 40 may also be another suitable type of valve or other flow regulator or pressure regulator that operates based on pressure differential between the crankcase 34 and the air intake system 14. The PCV system 36 is a general term used to describe a blow-by management system in engines where blow-by vapor is created. The PCV system 36 can also be referred to as a blow-by system.

An engine speed sensor 44 measures a rotational speed of the crankshaft 32 (i.e., engine speed). For example, the engine speed sensor 44 may measure the engine speed in revolutions per minute (RPM). A transmission 46 transfers the drive torque from the crankshaft 32 to a driveline (e.g., wheels) of a vehicle. In some implementations, the transmission 46 may be coupled to the crankshaft 32 via a fluid coupling such as a torque converter. A transmission output shaft speed (TOSS) sensor 48 measures a rotational speed of an output shaft of the transmission 46. For example, the TOSS sensor 48 may measure the TOSS in RPM. Measurements from the TOSS sensor 48 may indicate vehicle speed.

Exhaust gas resulting from combustion may be expelled from the cylinders 26 into an exhaust manifold 50. An exhaust treatment system (ETS) 52 may treat the exhaust gas in the exhaust manifold to remove particulates and/or decrease emissions before releasing the exhaust gas into the atmosphere. For example, the ETS 52 may include at least one of oxidation catalysts, nitrogen oxide absorbers/adsorbers, selective catalytic reduction systems, particulate matter filters, and three-way catalytic converters.

The control module 60 controls operation of the engine system 10. The control module 60 may receive signals from the throttle 16, the damage detection sensor 24, the fuel injectors 28, the spark plugs 30, the engine speed sensor 44, the transmission 46, the TOSS sensor 48, and/or the ETS 52. The control module 60 may control the engine 12, the throttle 16, the fuel injectors 28, the spark plugs 30, the transmission 46, and/or the ETS 52. The control module 60 may also implement the system or method of the present disclosure.

Figure 2:
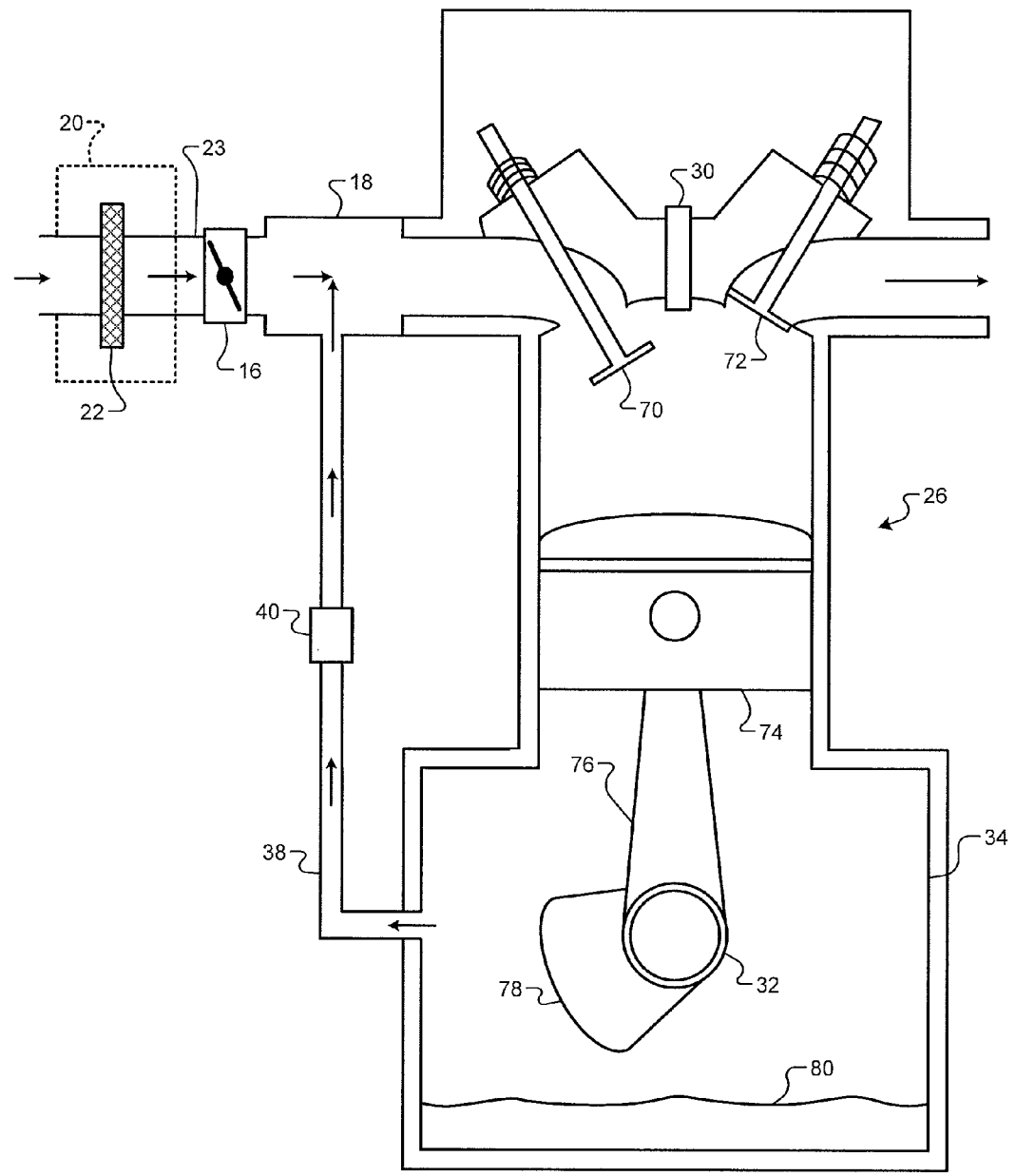
FIG. 2 is a cross-sectional view of a cylinder in accordance with the principles of the present disclosure.

Referring now to FIG. 2, an example of one of the plurality of cylinders 26 is shown. The cylinder 26 draws in air from the intake manifold 18 via an intake valve 70. In some implementations, the cylinder 26 may inject fuel into the air to create the A/F mixture at a location before the intake valve 70 (port fuel injection). The cylinder 26 expels exhaust gas produced during combustion into the exhaust manifold 50 via an exhaust valve 72. The intake valve 70 and the exhaust valve 72 may be actuated by one or more camshafts (not shown).

The cylinder 26 further includes a piston 74. The piston 74 compresses the A/F mixture within the cylinder 26 during a compression stroke of the engine 12. The A/F mixture is combusted (e.g., using spark plug 30) which drives the piston 74 downward generating drive torque. The drive torque rotates the crankshaft 32 which is connected to the piston 74 using a connecting rod 76. The crankshaft 32 may be connected to a counterweight 78. The crankcase 34 houses the various components of the cylinder 26. Specifically, the crankcase 34 includes oil 80 that lubricates the moving parts of the cylinder 26.

As previously described, blow-by vapors may enter the crankcase 34 and contaminate the oil 80 as well as build pressure in the crankcase 34. The PCV system 36, however, vents blow-by vapors from the crankcase 34. Specifically, the PCV tube 38 enables flow of blow-by vapors from the crankcase 34 to the air intake system 14. The PCV valve 40 may open when the blow-by vapors build up to exceed a critical pressure, thereby venting the blow-by vapors from the crankcase 34 into the air intake system 14. Alternatively, the blow-by vapors may vent out of the crankcase 34 based on pressure differential between the crankcase 34 and the location where the PCV system 36 connects to the air intake system 14.

Figure 3:
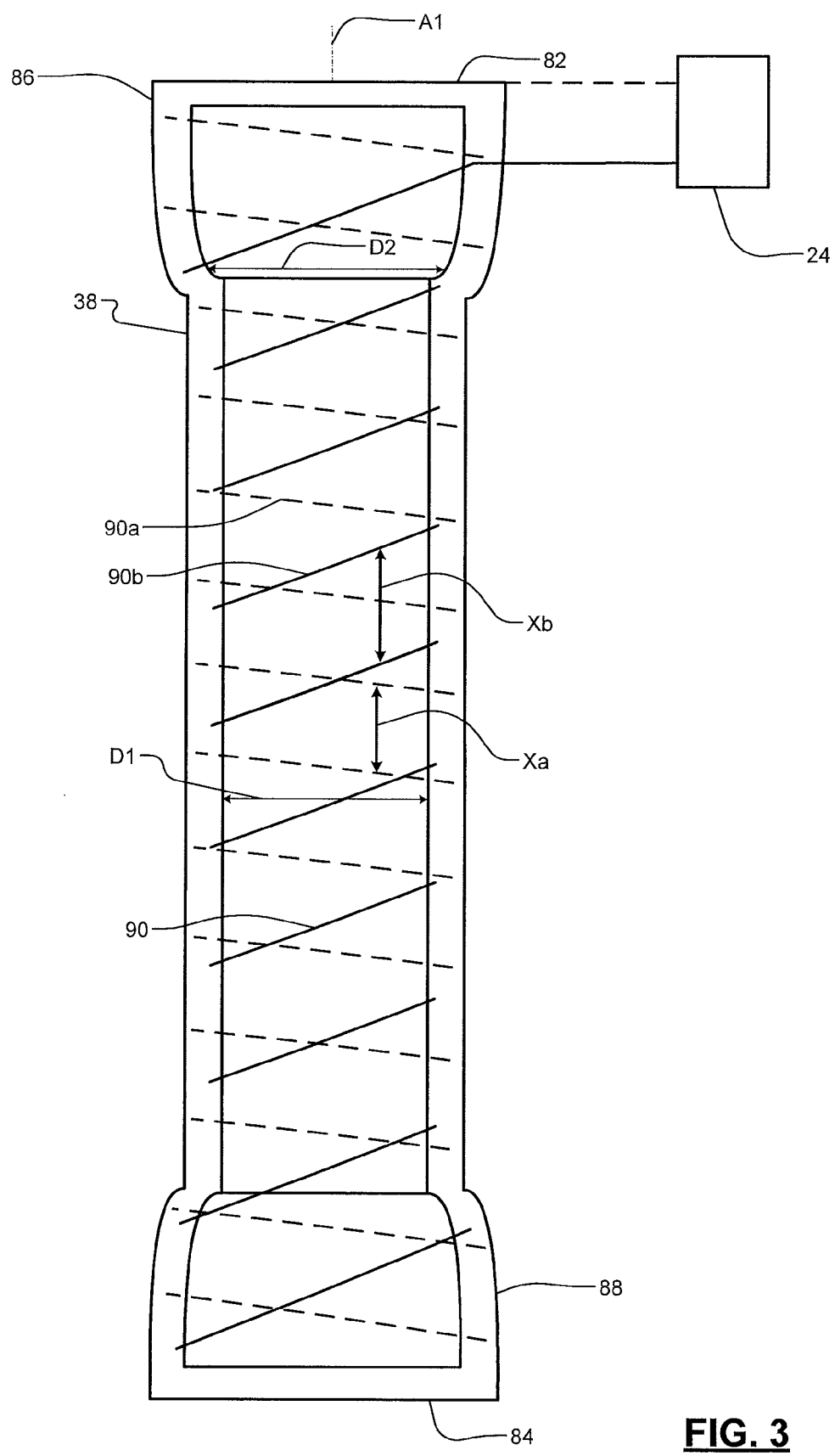
FIG. 3 is a schematic view of a positive crankcase ventilation (PCV) tube in accordance with the principles of the present disclosure.

Referring now to FIG. 3, an example of the PCV tube 38 is shown. The PCV tube 38 may extend from a proximal end 82 to a distal end 84 along a longitudinal axis A1. The proximal end 82 may include a proximal coupler 86, and the distal end may include a distal coupler 88. In the assembled configuration illustrated in FIGS. 1 and 2, the proximal coupler 86 may be coupled to the air intake system 14, and the distal coupler 88 may be coupled to the crankcase 34. For example, the proximal and distal couplers 86, 88 may be coupled to the air intake system 14 and the crankcase 34, respectively, using various attachment techniques known in the art, such as threading, welding, press-fitting, use of quick connects or clamps.

The PCV tube 38 may define a first minimum internal dimension (e.g., diameter) D1, and the proximal and/or distal coupler 86, 88 may define a second minimum internal dimension D2 (e.g., diameter). The first and second minimum internal dimensions D1, D2 may extend in a direction generally perpendicular (e.g., +/−15 degrees) to the longitudinal axis A1. In this regard, the first minimum internal dimension D1 may represent the smallest internal dimension of the PCV tube 38, and the second minimum internal dimension D2 may represent the smallest internal dimension of the proximal and distal couplers 86, 88.

In some implementations, the PCV tube 38 may include at least one damage detection circuit 90 (e.g., a conductor or wire) that communicates with the damage detection sensor 24 and/or the ECM 60. The damage detection circuit 90 may extend from the proximal end 82 of the PCV tube 38 to the distal end 84 of the PCV tube 38. In some implementations, the damage detection circuit 90 may be disposed within, or otherwise integrally formed with, the PCV tube 38 and the proximal and distal couplers 86, 88. For example, the damage detection circuit 90 may be molded into the PCV tube 38 and the proximal and distal coupler 86, 88.

The damage detection circuit 90 may have a helical shape including a plurality of helical windings. In some implementations, the damage detection circuit 90 may include a first conductor defining a left handed helix 90a extending from the proximal end 86 to the distal end 88, and a second conductor defining a right handed helix 90b extending from the proximal end to the distal end 88. The first and second conductors may form a continuous circuit. The left handed helix 90a may be disposed at a first dimension Da (e.g., diameter) relative to the axis A1 of the PCV tube 38, and the right handed helix 90b may be disposed at a second dimension Db (e.g., diameter) relative to the axis A1 of the PCV tube 38. The first and second dimensions Da, Db may extend in a direction generally perpendicular (e.g., +/−15 degrees) to the longitudinal axis A1, and generally parallel (e.g., +/−15 degrees) to the internal dimension D1 of the PCV tube 38. The first dimension Da may be greater than the second dimension Db, such that the left handed helix 90a is disposed radially outward of the right handed helix 90b. Accordingly, the left handed helix 90a may surround the right handed helix 90b.

Each helical wrap of the left and right handed helixes 90a, 90b may be separated from an adjacent helical wrap of the respective left and right handed helix 90a, 90b by a distance Xa, Xb (e.g., pitch). The distance Xa, Xb may extend in a direction generally parallel (e.g., +/−15 degrees) to the axis A1 of the PCV tube 38. In some implementations, the distance Xa and/or Xb may be less than the first and second minimum internal dimensions D1, D2 of the PCV tube 38 and the proximal and/or distal coupler 86, 88, respectively.

Figure 4:
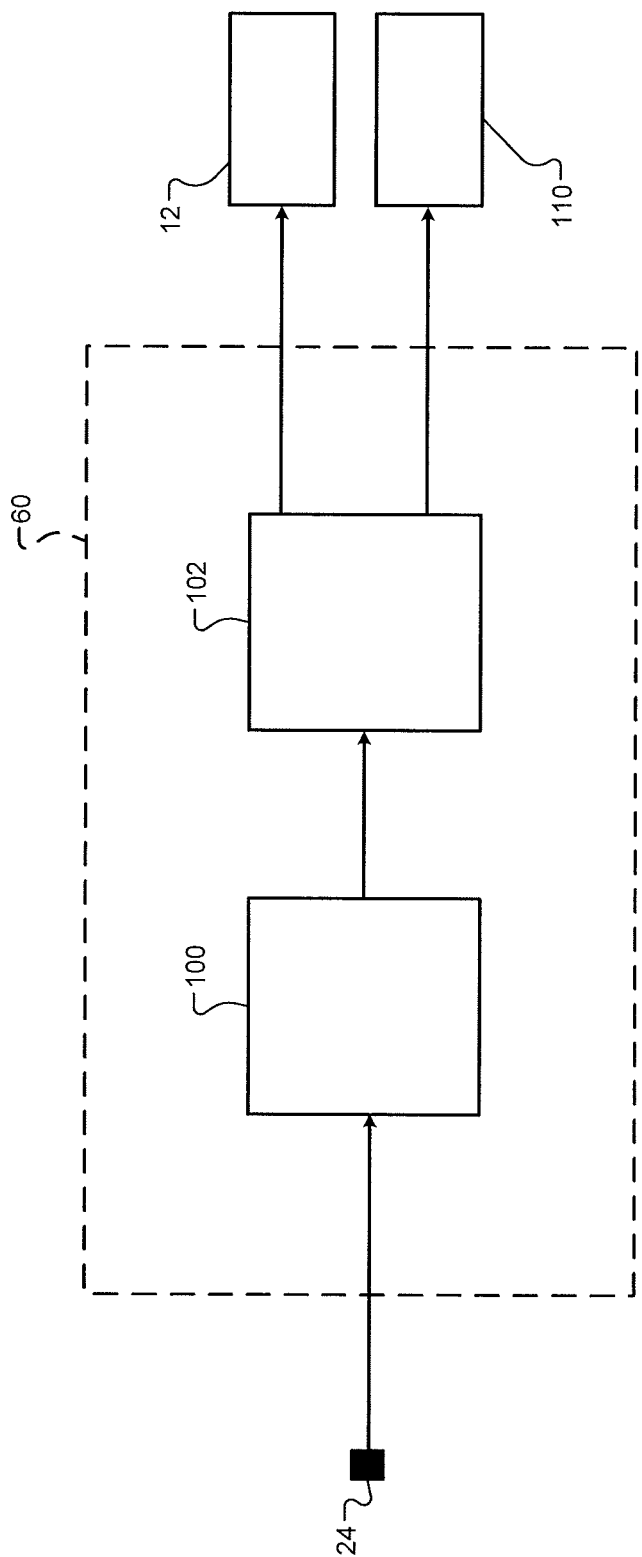
FIG. 4 is a functional block diagram of a control module in accordance with the principles of the present disclosure.

Referring now to FIG. 4, an example of the control module 60 is shown. The control module 60 may include at least one damage detection module 100 and a warning module 102. The damage detection module 100 may communicate with the damage detection sensor 24 and/or the damage detection circuit 90. In this regard, the damage detection module 100 may receive a signal from the damage detection sensor 24 when the damage detection sensor 24 detects a change (e.g., a break and/or change in electrical resistance) in the damage detection circuit 90.

The warning module 102 may communicate with the damage detection module 100. In particular, upon the detection of damage in the PCV system 36, the warning module 102 may receive a damage detection signal from the damage detection module 100 indicating the presence of damage, such as a hole or leak, in the PCV tube 38.

The warning module 102 may communicate with the instrument panel 110. In this regard, the warning module 102 may take one or more remedial actions when damage is detected in the PCV system 36. For example, if the damage detection sensor 24 detects damage in the PCV system 36 (e.g., a leak or other damage to the PCV tube 38), the damage detection module 100 may illuminate a malfunction indicator lamp (MIL) of the instrument panel 110, store a predetermined diagnostic trouble code (DTC) associated with damage in the PCV system 36 in memory, and/or warn the operator of the presence of damage in the PCV system 36.

Figure 5:
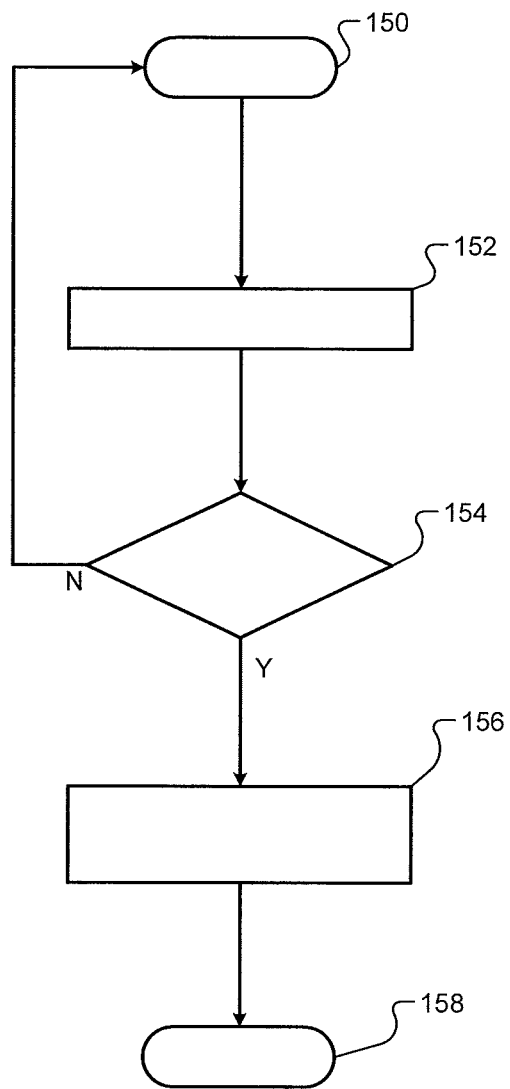
FIG. 5 is a flow diagram of a method for detecting damage in a PCV tube in accordance with the principles of the present disclosure.

Referring now to FIG. 5, a method for detecting damage in the PCV system 36 begins at 150. At 152, the control module 60 receives a signal from the damage detection sensor 24 and/or the damage detection circuit 90. In particular, the damage detection sensor 24 and/or the damage detection circuit 90 may send a signal to the damage detection module 100.

At 154, the damage detection module 100 determines whether there is any damage to the PCV system 36. For example, the damage detection module 100 may determine whether there is any damage (e.g., a hole, abrasion, leak, etc.) to the PCV tube 38 and/or the proximal or distal coupler 86, 88. In particular, at 154 the damage detection module 100 may determine whether the electrical characteristics of the damage detection circuit 90 have changed. In some implementations, the damage detection module 100 may determine whether the damage detection circuit 90 is an open circuit and/or whether the electrical resistance of the damage detection circuit 90 has changed by more than a predetermined amount.

If 154 is true, control may continue to 156. If 154 is false, control may return to 150. At 156, the control module 60 may initiate a corrective and/or remedial action. Specifically, the warning module 102 illuminate the malfunction indicator lamp of the instrument panel 110 to display a warning to the operator and set the predetermined DTC in memory. Control may then continue to 158.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, driver applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A positive crankcase ventilation (PCV) system for an engine, the PCV system comprising:
    a PCV tube that defines a flowpath extending along an axis;
    a damage detection circuit that is associated with the PCV tube and that includes:
        a first conductor that includes a first plurality of helical wraps defining a left handed helix; and
        a second conductor that includes a second plurality of helical wraps defining a right handed helix and that is electrically connected to the first conductor,
        wherein the left handed helix has a first diameter,
        wherein the right handed helix has a second diameter that is less than the first diameter, and
        wherein a first distance between each of the helical wraps of the first plurality of helical wraps is less than a second distance between each of the helical wraps of the second plurality of helical wraps; and
    a damage detection module that selectively indicates that a fault is present in the PCV tube based on a change in a characteristic of the damage detection circuit and that illuminates a malfunction indicator lamp (MIL) when the fault is present.

2. The PCV system of claim 1, wherein damage detection circuit is integrally formed with the PCV tube.

3. The PCV system of claim 1, wherein the damage detection circuit is molded into the PCV tube.

4. The PCV system of claim 1, wherein at least one of the first distance and the second distance is less than a flowpath dimension that is perpendicular to the axis.

5. The PCV system of claim 4, wherein the first distance and the second distance is less than the flowpath dimension.

6. The PCV system of claim 1, wherein the damage detection module indicates that the fault is present in the PCV tube when a difference between an electrical resistance of the damage detection circuit and a previous electrical resistance of the damage detection circuit is greater than a predetermined value.

7. The PCV system of claim 1, wherein the damage detection module stores a predetermined diagnostic trouble code (DTC) associated with the fault in the PCV tube in memory when the fault is present.

8. A method for indicating the presence of a fault in a positive crankcase ventilation (PCV) tube of a vehicle, the method comprising:
    receiving input indicative of a characteristic of a damage detection circuit associated with the PCV tube,
    the PCV tube defining a flowpath extending along an axis, and
    the damage detection circuit including:
        a first conductor that includes a first plurality of helical wraps defining a left handed helix; and
        a second conductor that includes a second plurality of helical wraps defining a right handed helix and that is electrically connected to the first conductor,
        wherein the left handed helix has a first diameter,
        wherein the right handed helix has a second diameter that is less than the first diameter, and
        wherein a first distance between each of the helical wraps of the first plurality of helical wraps is less than a second distance between each of the helical wraps of the second plurality of helical wraps; and
    selectively indicating that a fault is present in the PCV tube based on a change in the characteristic of the damage detection circuit; and
    illuminating a malfunction indicator lamp (MIL) when the fault is present.

9. The method of claim 8, wherein the damage detection circuit is integrally formed with the PCV tube.

10. The method of claim 8, wherein the damage detection circuit is molded into the PCV tube.

11. The method of claim 8, wherein at least one of the first distance and the second distance is less than a flowpath dimension that is perpendicular to the axis.

12. The method of claim 8, wherein selectively indicating that a fault is present in the PCV tube includes indicating that the fault is present in the PCV tube when a difference between an electrical resistance of the damage detection circuit and a previous electrical resistance of the damage detection circuit is greater than a predetermined value.

13. The method of claim 8 further comprising storing a predetermined diagnostic trouble code (DTC) associated with the fault in the PCV tube in memory when the fault is present.

* * * * *